Sept. 6, 1932.  F. L. MILLER  1,875,477
COUPLING DEVICE
Filed March 30, 1931    2 Sheets-Sheet 1

Inventor
FRANK L MILLER
C. L. Parker Jr.
Attorney

Sept. 6, 1932.  F. L. MILLER  1,875,477
COUPLING DEVICE
Filed March 30, 1931  2 Sheets-Sheet 2
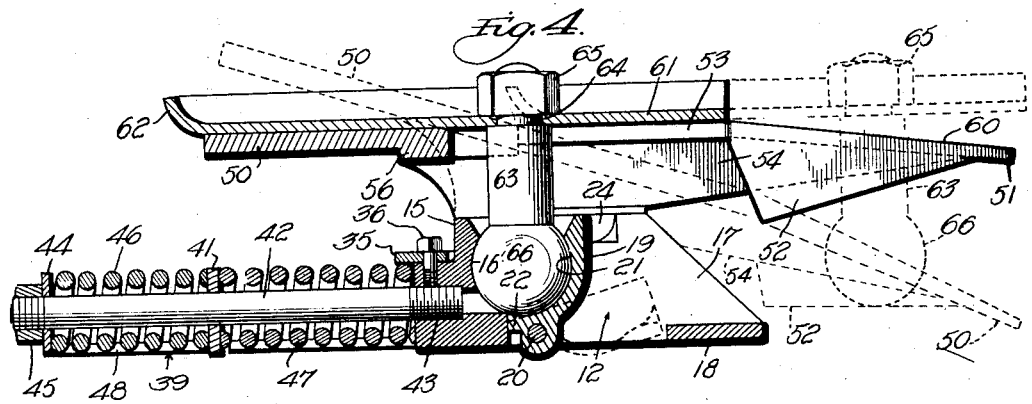
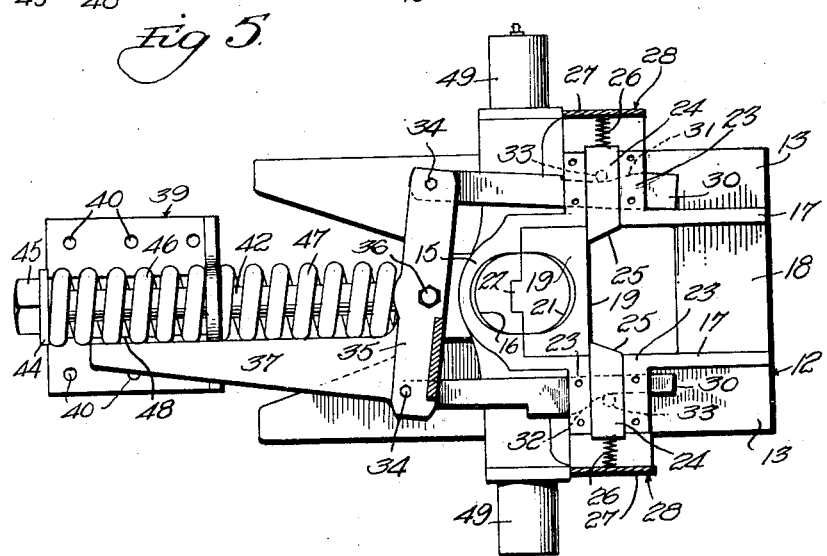
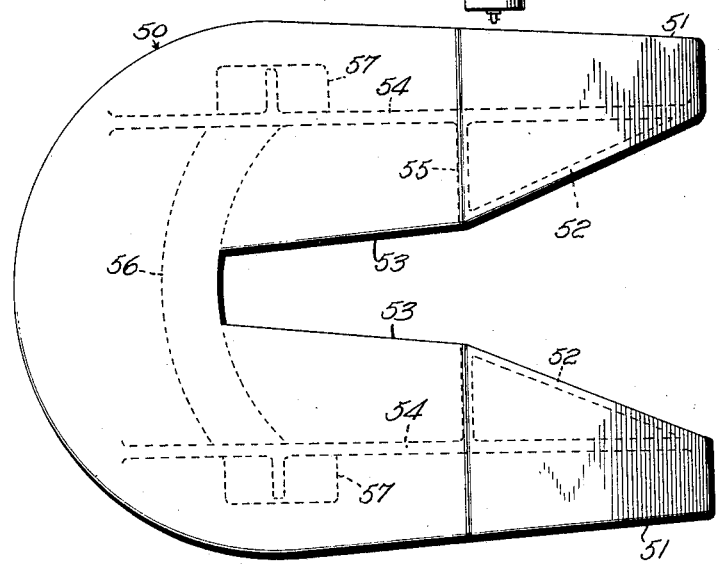
Inventor
FRANK L. MILLER
C. L. Parker Jr.
Attorney Patented Sept. 6, 1932

1,875,477

UNITED STATES PATENT OFFICE

FRANK L. MILLER, OF PARKERSBURG, WEST VIRGINIA, ASSIGNOR TO DAVIS-MILLER ENGINEERING COMPANY, OF PARKERSBURG, WEST VIRGINIA, A CORPORATION OF WEST VIRGINIA

COUPLING DEVICE

Application filed March 30, 1931. Serial No. 526,511.

This invention relates to coupling devices, and particularly devices for coupling motor tractors to trailers and similar devices, and is an improvement over the structure shown in my copending application Serial No. 434,706, filed March 10, 1930.

In my copending application referred to, I have disclosed a coupling socket including stationary and movable members carried by the tractor, the movable socket member being adapted to open to permit a coupling member connected to the trailer to enter thereinto. Automatic latch means is provided for the movable socket member and acts partly as the thrust take-up means during the operation of the device. Means also is provided for guiding the coupling member into the socket as the tractor is backed toward the trailer.

An important object of the present invention is to improve the means for guiding the coupling member into the socket to permit this action to take place more easily.

A further object is to provide a device of the character referred to which is mounted for longitudinal movement with respect to the tractor, and which movement is opposed by spring action to provide a cushion coupling.

A further object is to provide improved cam means manually operable for releasing the latches to permit the trailer and tractor to be disconnected, and to provide means operative as the trailer becomes disconnected for rendering the cam means automatically inoperative whereby the latches are placed in position ready to lock a trailer to the tractor.

Other objects and advantages of the invention will become apparent during the course of the following description.

In the drawings I have shown one embodiment of the invention. In this showing,

Figure 1 is a plan view, the guide plate being removed,

Figure 2 is a side elevation,

Figure 3 is a rear elevation of the complete device,

Figure 4 is a central vertical longitudinal sectional view on line 4—4 of Figure 1, Figure 5 is a horizontal sectional view on line 5—5 of Figure 3, and, Figure 6 is a plan view of the pivoted guide plate.

Referring to the drawings, the numeral 10 designates opposite pairs of guides having openings 11 for the reception of fastening elements by means of which the guides may be secured against the top of the rear end of a tractor. A body indicated as a whole by the numeral 12 is provided with outstanding side flanges 13 slidable beneath the inner upwardly offset guide flanges 14 of the guides 10.

The body is provided substantially centrally thereof with an integral socket member 15 having a substantially semispherical recess 16 therein. Rearwardly of the socket member 15, the body is provided with spaced parallel side walls 17 connected at their rear ends by a web 18. In the space between the side walls 17 a complementary socket member 19 is arranged, and this socket member is pivotally connected to the body 12 by a pivot pin 20. The socket member 19 also has a substantially semi-spherical recess 21 formed therein. Obviously the members 15 and 19 form complementary socket members and are adapted to receive a coupling member to be described. Centrally of the width of the socket, the member 19 thereof is provided with a projecting portion 22 for a purpose to be described.

Each side wall 17 is provided with spaced parallel outstanding guides 23, and each of these guides receives a latch member 24 adapted to engage behind the rear face of the socket member 19 when the latter is in closed position. The latches are provided with beveled inner ends 25, as shown in Figure 5, to facilitate movement of the socket member 19 to closed position. The latches are urged inwardly by springs 26 bearing against the outer faces 27 of substantially U-shaped retainers 28, the tops of these retainers being secured to the guides 23 by screws 29.

The retainers 28 have their lower walls spaced below the latches 24 to slidably support cam rods 30. These rods are provided with oppositely faced cams 31 and 32 adapted to engage depending pins 33 carried by the latches 24. The rear ends of the cam bars 30 are pivotally connected as at 34 to a cross bar 35, and this bar is pivotally connected substantially centrally thereof as at 36 to the body 12 forwardly of the socket. The cross bar 35 carries a preferably integral lever 37, movement of which is adapted to swing the cross bar and operate the cam bars. The cross bar 35 also carries a forwardly and inwardly extending cam arm 38 for a purpose to be described.

A plate 39 is arranged forwardly of the body 12 and is provided with openings 40 to receive bolts or other fastening elements whereby the plate may be rigidly secured to the tractor. The plate 39 is provided at its rear end with an upstanding flange 41 as clearly shown in Figures 1 and 2. A rod 42 is threaded at its rear end as at 43, and the forward end of the rod 42 projects forwardly through the vertical flange 41, as shown in Figure 4. A thrust washer 44 is retained on the forward end of the rod 42 by a nut 45. A spring 46 surrounds the rod 42 between the flange 41 and washer 44, while a similar spring 47 surrounds the rod 42 between the body 12 and the washer 41. To accommodate the bottom of the spring, the plate 39 has its central portion cut away as at 48.

The body 12 is provided on opposite sides with outstanding alined trunnions 49, as clearly shown in Figures 1, 2 and 5. A guide plate 50 is arranged above the body 12 and is provided with rearwardly extending arms 51. Adjacent their rear ends, the arms 51 are provided at their inner edges with depending skirts 52 which converge forwardly at a relatively sharp angle. Forwardly of the skirts 52, the inner edges 53 of the arms 51 converge at a slight angle, as clearly shown in Figure 6. Adjacent opposite sides, the plate 50 is provided with depending side walls 54 connected to the skirts 52 by webs 55. A reinforcing rib 56 extends between the side walls 54. Bosses 57 are formed integral with and extend outwardly from the side walls 54. These bosses, together with caps 58, form bearings rotatably receiving the trunnions 49, and the caps 58 are held in position by bolts 59. It will be apparent that the plate 50 tilts about the axis of the trunnions 49 and this tilting action is utilized for assisting in guiding a coupling member to be described, into the socket. This guiding action is facilitated by the convergence of the inner edges of the arms 51, and the downward slope of the rear portion of the upper faces of these arms as indicated by the numeral 60.

A coupling plate 61 is connected in any suitable manner to the trailer and preferably has its side and forward edges turned upwardly as at 62 to facilitate the operation of the device in a manner to be described. A coupling shank 63 is carried by the plate 61. This shank is provided with a reduced upper end 64 passing through an opening in the plate 61, and the shank is retained in position by a nut 65. A ball 66 is carried by the lower end of the shank 63 for reception in the socket members 15 and 19.

The operation of the device is as follows:

The plate 50 obviously has its greatest weight arranged rearwardly of the tilting arms of the plate, and accordingly the plate normally occupies the dotted line position shown in Figure 4. When it is desired to couple the tractor to a trailer, the tractor is backed toward the trailer to cause the shank 63 to enter between the arms 51 of the guide plate. If the coupling is not accurately alined with the shank 63, the diverging inner edges of the arms 51 will guide the shank inwardly to a position in alinement with the socket.

Rearward movement of the tractor is continued, and the upturned edges 62 of the plate 61 contact with the plate 50 to minimize friction between these elements, and when the ball reaches a position almost within the socket, the plate 61 will swing the plate 50 to its operative position, as shown in solid lines in Figure 4. During the movement referred to, the plate 50 will elevate the shank 63 if the ball is in a position slightly below the plane of the socket so that the ball will be in a proper position to enter into the socket.

During this time, the socket member 19 will occupy the dotted line position shown in Figure 4, and accordingly the ball will move over the socket member 19 until the ball contacts with the projecting end 22, which will extend upwardly when the movable socket member is in the position described. Continued movement of the ball into the socket causes the projecting end 22 of the socket member 19 to be swung inwardly and downwardly and accordingly the movable socket member will be moved upwardly toward the operative position shown in solid lines in Figure 4.

When the ball 66 reaches a position exactly centered in the socket, the movable member 19 thereof will have assumed the operative position shown in solid lines in Figure 4, and as it approaches such position, it bears against the bevel faces 25 of the latches to move these members outwardly against the tension of the springs 26. As soon as socket member 19 reaches operative position, the latches 24 will snap back into operative position as shown in Figures 1 and 5.

The lever 37 is operative for releasing the ball from the socket. By pulling on the lever 37, movement will be transmitted to the cam bars 30 to cause the cams 31 and 32 to engage the pins 33. This causes the latches to be moved outwardly and thus release the movable socket member. The tractor then can be moved forwardly, and the coupling ball 66 will move out of the socket to disconnect the trailer from the tractor. In this connection it will be noted that when the lever 37 is pulled outwardly, the cams 31 and 32 will ride beyond the pins 33, and accordingly the latches will be held in retracted position after the lever 37 is released. When the tractor is moved forwardly, the ball 66 will move out of the socket, and since the previously described movement of the lever 37 will have moved the cam arm 38 inwardly, it will be apparent that this arm is arranged in the path of travel of the shank 63. As the trailer is released from the tractor, therefore, the shank 63 will contact with the arm 38 to return the cam mechanism to normal position and thus release the latch 24, and accordingly the latches are placed in position ready to be automatically operated when another trailer is connected to the tractor. Obviously no spring means is employed for holding the lever 37 and associated elements in operative position, and accordingly the driver of the tractor merely may pull the lever 37 outwardly and release it, and then drive the tractor forwardly to release it from the trailer.

It will be apparent that the pulling thrust exerted when the device is in operation is taken up between three elements, namely the two latches 24 and the pivot pin 20. Thus the thrust is taken care of very effectively, substantially 50 per cent. of the thrust being taken up by the pin 20. The spring 47 acts to cushion thrusts in one direction, while the spring 46 cushions thrusts in the opposite direction. Accordingly the thrusts occurring during the pulling of the trailer are taken care of as are those occurring when the tractor is backed into position to be coupled to a trailer. In this connection, it will be noted that the plate 39 is fixed to the tractor while the body 12 is adapted to slide longitudinally with respect to the tractor against the tension of the springs 46 and 47.

From the foregoing it will be apparent that the present device is simple in construction and permits the coupling action to be quickly and readily completed. It also will be apparent that the provision of the thrust springs 46 and 47 cushions thrusts of the body 12 in both directions, thus improving the action of the device and greatly lengthening its life.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A device of the character described comprising a body adapted to be mounted over a portion of a motor vehicle adjacent the rear end thereof and having a portion forming a socket member, a coacting socket member pivotally connected to said body to swing vertically between operative and inoperative positions, means for locking said last named member in operative position, said members forming a spherical socket, a coupling element adapted for connection with a vehicle to be towed by said motor vehicle, and a guide plate pivotally connected to said body and operative for engaging said coupling element to position the latter laterally and vertically for movement into said socket members.

2. A device of the character described comprising a body adapted to be mounted over a portion of a motor vehicle adjacent the rear end thereof and having a portion forming a socket member, a coacting socket member pivotally connected to said body to swing vertically between operative and inoperative positions, means for locking said last named member in operative position, said members forming a spherical socket, a coupling element adapted for connection with a vehicle to be towed by said motor vehicle and having a coupling member at its lower end engageable in said socket members, said coacting socket member having a projection engageable by said coupling member as it moves to operative position in said socket members for swinging said coacting socket member to operative position, and a guide plate pivoted on a horizontal axis to said body and engageable with portions of said coupling element to position said coupling member vertically and laterally for movement into said socket members.

3. A device of the character described comprising a body adapted to be mounted over a portion of a motor vehicle adjacent the rear end thereof and having a portion forming a socket member, a coacting socket member pivotally connected to said body and vertically movable between operative and inoperative position said members forming a spherical socket, a coupling element adapted for connection with a vehicle to be towed by said motor vehicle and including a top plate and a depending shank having a ball at its lower end adapted for engagement in said socket members, and a guide plate pivotally connected to said body and operative for engaging said plate and said shank to position said ball laterally and vertically for movement into said socket members.

4. A device of the character described comprising a body adapted to be mounted over a portion of a motor vehicle adjacent the rear end thereof and having a portion forming a socket member, a coacting socket member pivotally connected to said body and vertically movable between operative and inoperative positions, said members forming a spherical socket, a coupling element adapted for connection with a vehicle to be towed by said motor vehicle and including a top plate and a depending shank having a ball at its lower end adapted for engagement in said socket members, and a guide plate pivotally connected to said body to swing about a horizontal axis, said guide plate being engageable beneath said first named plate to elevate it to a position with said ball in the horizontal plane of said socket members and being provided with a forwardly converging slot in its rear end engageable with said shank to guide said ball laterally into said socket members.

5. A device of the character described comprising a body adapted to be mounted over a portion of a motor vehicle adjacent the rear end thereof and having a portion forming a socket member, a coacting socket member pivotally connected to said body to swing about a horizontal axis between operative and inoperative positions, a coupling element adapted for connection with a vehicle to be towed by said motor vehicle and including a ball adapted for engagement in said socket members, said coacting socket member having a projection engageable by said ball as it moves into said socket members for swinging said coacting socket member to operative position, means for locking said coacting socket member in operative position, and a guide plate pivotally connected to said body and operative for positioning said ball laterally and vertically for movement into said socket members.

6. A device of the character described comprising a body adapted to be mounted over a portion of a motor vehicle adjacent the rear end thereof and having a portion forming a socket member, a coacting socket member pivotally connected to said body to swing about a horizontal axis between operative and inoperative positions, a coupling plate adapted for connection with a vehicle to be towed, a depending ball carried by said coupling plate and adapted for engagement in said socket members, said coacting socket member having a projection engageable by said ball as it moves into said socket member for swinging said coacting socket member to operative position, means for locking said coacting socket member in operative position, and a guide plate pivotally connected to said body and provided with a forwardly converging slot in its rear end, said guide plate and the walls of its slot being engageable with said coupling plate for positioning said ball laterally and vertically for movement into said socket members.

7. A device of the character described comprising a body adapted to be mounted over a portion of a motor vehicle adjacent the rear end thereof and having a portion forming a socket member, a coacting socket member pivotally connected to said body to swing vertically between operative and inoperative positions, means for locking said last named member in operative position, said members forming a spherical socket, a coupling element adapted for connection with a vehicle to be towed, and a guide plate pivotally connected to said body on an axis arranged forwardly of the center of gravity of said plate and coincident with the center of the socket formed by said member, said guide plate being engageable with said coupling element to position the latter vertically and laterally for movement into said socket member.

8. A device of the character described comprising a body adapted to be mounted over a portion of a motor vehicle adjacent the rear end thereof and having a portion forming a socket member, a coacting socket member pivotally connected to said body and movable vertically between operative and inoperative positions, said members forming a spherical socket, a coupling element adapted for connection with a vehicle to be towed and including a top plate and a depending shank having a ball at its lower end adapted for engagement in said socket members, and a guide plate pivotally connected to said body on an axis arranged forwardly of the center of gravity of said plate and coincident with the center of the socket defined by said socket members, said guide plate being engageable with said top plate and said shank to position said ball laterally and vertically for movement into said socket members.

9. A device of the character described comprising a body adapted to be mounted over a portion of a motor vehicle adjacent the rear end thereof and having a portion forming a socket member, a coacting socket member pivotally connected to said body to swing vertically between operative and inoperative positions, means for locking said last named member in position, a coupling element adapted for connection with a vehicle to be towed and having a coupling member at its lower end engageable in said socket members, said coacting socket member having a projection engageable by said coupling member as it moves to operative position in said socket for swinging said coacting socket member to operative position, and a guide plate pivoted on a horizontal axis to said body forwardly of the center of gravity of the guide plate and engageable with portions of said coupling element to position said coupling member vertically and laterally for movement into said socket members.

10. A device of the character described comprising a body adapted to be mounted over a portion of a motor vehicle adjacent the rear end thereof and having a portion forming a socket member, a coacting socket member pivotally connected to said body to swing about a horizontal axis between operative and inoperative positions, a coupling element adapted for connection with a vehicle to be towed and including a top plate, a depending shank and a ball carried by the lower end of said shank, said coacting socket having a projection engageable by said ball as it moves into said socket members for moving said coacting socket member to operative position, and a guide plate pivoted to said body on an axis coincident with the center of the socket defined by said socket members and forwardly of the center of gravity of the guide plate and engageable with said top plate and said shank for positioning said ball vertically and laterally for movement into said socket members.

11. A device of the character described comprising a body adapted to be mounted over a portion of a motor vehicle adjacent the rear end thereof and movable longitudinally with respect to the vehicle, a plurality of guide members engaging said body for guiding it in such longitudinal movement, said body having a portion forming a socket member, a coacting socket member pivotally connected to said body and movable vertically between operative and inoperative positions, said socket members forming a spherical socket, a coupling element adapted for connection with a vehicle to be towed and including a top plate and a depending shank having a ball at its lower end adapted for engagement in said socket members, a substantially U-shaped guide plate pivotally connected to said body and having the inner edges of its arms converging forwardly, said guide plate and said converging edges being respectively engageable with said top plate and said shank to guide said ball into said socket members, and spring means tending to prevent longitudinal movement of said body in either direction from a normal position.

12. A device of the character described comprising a body adapted to be mounted over a portion of a motor vehicle adjacent the rear end thereof and having a portion forming a socket member, a coacting socket member pivotally connected to said body to swing between operative and inoperative positions, spring latch means for said last named member automatically movable toward operative position, a coupling element adapted for connection with a vehicle to be towed and including a shank having a member at its lower end adapted to be moved into said socket members when said movable socket member is in inoperative position, manual means for rendering said latch means inoperative to permit the member on said shank to move out of said socket members, and means including a member engageable with said shank as the member thereof moves out of said socket members for rendering said manual means inoperative.

13. A device of the character described comprising a socket adapted to be mounted over a portion of a motor vehicle adjacent the rear end thereof and including a pair of coacting members one of which is pivoted to swing between operative and inoperative positions, a coupling element adapted for connection with a vehicle to be towed and including a shank having a ball at its lower end adapted to be received in said socket when the movable member thereof is in operative position, a spring pressed latch engageable outwardly of said movable socket member to retain it in operative position and provided with a beveled face engageable by said movable socket member as the latter moves to operative position for depressing the latch, a cam operative for moving the latch to inoperative position, operating means for said cam, and a member connected to said operating means and arranged in the path of travel of the shank when said latch has been moved to inoperative position by said cam and adapted to be engaged by said shank as the ball moves out of said socket for returning said cam to inoperative position and releasing said latch.

In testimony whereof I affix my signature.
FRANK L. MILLER.